US008522049B1

(12) United States Patent
Ahmadi

(10) Patent No.: US 8,522,049 B1
(45) Date of Patent: Aug. 27, 2013

(54) SECURE PROCESSOR FOR EXTREME OUTDOOR TEMPERATURE CONDITIONS

(75) Inventor: Reza Ahmadi, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1427 days.

(21) Appl. No.: 12/221,289

(22) Filed: Jul. 31, 2008

(51) Int. Cl.
*H04L 9/06* (2006.01)
*H04L 29/02* (2006.01)

(52) U.S. Cl.
USPC .......... 713/193; 726/34

(58) Field of Classification Search
None
See application file for complete search history.

(56) References Cited

U.S. PATENT DOCUMENTS

| | | | | |
|---|---|---|---|---|
| 5,763,858 | A * | 6/1998 | Jones | 219/506 |
| 5,860,741 | A * | 1/1999 | Tsao et al. | 374/129 |
| 6,457,650 | B1 * | 10/2002 | Suzuki et al. | 235/492 |
| 2010/0313271 | A1 * | 12/2010 | Johnson et al. | 726/24 |

OTHER PUBLICATIONS

Innovative Adaptations of Commercial Flash memories for Military Systems. Verma et al. IEEE(1996).*
Tamper Resistance mechanisms for secure embedded Systems. Ravi et al. IEEE(2004).*

* cited by examiner

*Primary Examiner* — Venkat Perungavoor
(74) *Attorney, Agent, or Firm* — North Weber & Baugh LLP

(57) ABSTRACT

If the temperature of a secure device falls below a second temperature, then sensitive information is automatically erased from a secure memory. To allow the secure device to operate in very cold ambient temperatures that are below the second temperature, a novel heater circuit is provided. If the temperature of the secure device drops below a first temperature, then the heater heats the secure processor. If AC power is lost, such as in a power outage, energy for the heater is provided by a secure battery, otherwise the heater is powered from an external source. The heater barely provides enough heat to keep the temperature of the secure processor at the first temperature under normal heat transfer conditions. If an attacker withdraws heat from the circuit unusually rapidly, then the temperature of the secure processor will fall to the second temperature causing a tamper detect and secure memory erasure.

22 Claims, 4 Drawing Sheets

SECURE PROCESSOR FOR EXTREME OUTDOOR TEMPERATURE CONDITIONS

TECHNICAL FIELD

The described embodiments relate to secure electronic devices that are to operate in extremely cold environmental conditions.

BACKGROUND INFORMATION

Financial transactions are often made using secure electronic devices such as Automatic Teller Machines (ATMs) and Point Of Sale (POS) terminals and devices. One type of POS device is a fuel dispenser such as a gasoline pump. In one type of transaction, a user swipes a magnetic credit card or debit card through a magnetic card reader of a gasoline pump. The user then uses a keypad on the gasoline pump to enter some form of identity verification information such as a ZIP code or a Personal Identification Number (PIN). After the user has dispensed an amount of fuel, the pump communicates, directly or indirectly, with a financial institution to charge the user for the purchase. Encryption/decryption keys stored in the gasoline pump are used in this communication to make the communication with the financial institution a secure communication. The encryption/decryption keys are very sensitive information because if a thief were to possess the keys, then the thief might be able to interact with the financial institution such that the thief could extract money from the user's account or make unauthorized purchases and charge them to the user's account. Makers of POS terminals and devices, such as gasoline pumps, therefore go to considerable effort to provide anti-tamper circuitry that prevents thieves from gaining access to the keys and other sensitive financial information stored in the POS device.

Thieves unfortunately continue to foil the anti-tamper circuitry and to steal keys, account numbers, and security verification information from POS devices such as gasoline pumps. In one type of attack, the thief steals the electronics portion of the POS device in which the sensitive information is stored. The thief then reduces the temperature of the electronics portion to an extremely low temperature. The electronics may, for example, be placed in a liquid nitrogen bath. At some low temperature, the anti-tamper electronics of the electronics stops operating. The sensitive financial information, however, remains stored in memory in the electronics portion. The thief may then be able to use sophisticated equipment (for example, X-ray imaging equipment) to read the information out of the memory.

To prevent this type of security attack, POS devices often include temperature sensors and associated anti-tamper circuitry. If the anti-tamper circuitry detects that the temperature of the POS device has reached a predetermined low temperature, then the anti-tamper circuitry causes the sensitive information (for example, the encryption keys, account numbers, and personal identification numbers) to be erased from memory before the anti-tamper circuitry gets so cold that it stops working. The erasing, however, requires an amount of energy. The anti-tamper circuitry and the memory are therefore sometimes provided with auxiliary power in the form of a small battery. The security erasure can be performed using energy from an external power supply, or if no such power is available, from the small battery.

To prevent the thief from disabling the security erasure by removing all power from the electronics including the battery power, the anti-tamper circuit monitors the voltage of the small battery. If the battery is removed, then no voltage is detected, a tamper condition is detected, and the memory is erased. Energy for the security erasure, shortly after the battery has been detected to have been removed, is provided by a capacitor that is integrated onto the same integrated circuit as the memory and the anti-tamper circuit. Disconnecting the external power supply and removing the small battery therefore does not prevent the security erasure because enough energy to perform the secure erasure is stored in the capacitor.

SUMMARY

If the sensed temperature of a secure device falls below a second temperature (for example, below negative forty degrees Celsius), then a tamper condition is detected. In response, a secure memory of the secure device is automatically erased thereby erasing sensitive information stored in the secure memory. An example of the secure device is a secure module of a fuel dispenser such as a gasoline pump.

To allow the secure device to operate in harsh environmental conditions having very cold ambient temperatures below the second temperature, a novel heater circuit is provided. The novel heater is disposed in close thermal proximity to the secure memory. If the temperature of the secure device drops below a first temperature (for example, below negative twenty degrees Celsius), then the heater increases localized heating of the secure processor. The heater barely provides enough heat to keep the temperature of the secure processor at the first temperature under normal heat transfer conditions within the fuel dispenser. If an attacker were to withdraw too much heat from the circuit too rapidly in a security attack, then the temperature of the secure device would fall to the second temperature thereby causing a tamper condition to occur and thereby causing the secure memory to be erased. If, on the other hand, a drop in ambient air temperature due to ordinary relatively-slow changing environmental conditions were to occur, then the novel heater would maintain the temperature of the secure device at the first temperature until the environmental conditions warm up to be above the first temperature.

If AC power to the fuel dispenser is lost (such as in an electric utility company power outage) during the cold environmental conditions, then energy for the heater is provided by a secure battery, otherwise the heater is powered by energy received from an external source. By powering the heater using secure battery power during a power outage situation, false tamper detects that would otherwise occur in power outage conditions on very cold days are prevented.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
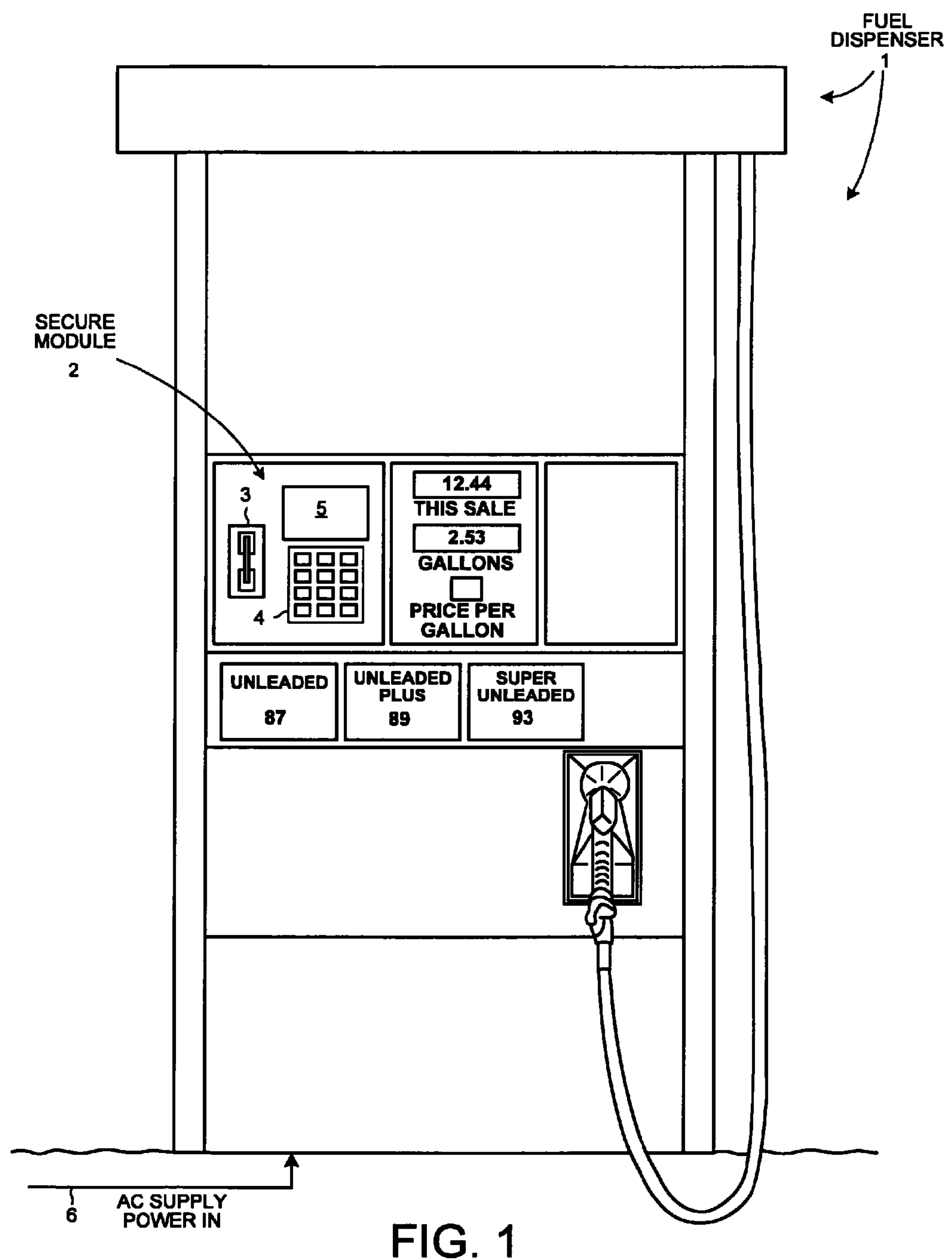
FIG. 1 is a view of the front of a fuel dispenser.

FIG. 1 is a view of a fuel dispenser 1. Fuel dispenser 1 is one example of a Point of Sale (POS) device in which the present invention finds utility. Fuel dispenser 1 is of a modular design and includes a secure module 2. Secure module 2 can be removed from the remainder of fuel dispenser 1. Secure module 2, in this example, includes a magnetic card reader 3, a key pad 4, and a display 5. A user who wishes to dispense and purchase fuel from fuel dispenser 1 may swipe a credit card or debit card through the magnetic card reader 3, and then enter some form of identity verification information such as a ZIP code or a Personal Identification Number (PIN) using keypad 4. After the user has dispensed an amount of fuel, fuel dispenser 1 or a central controller that controls multiple such fuel dispensers communicates electronically with a financial institution to charge or debit the user for the purchase. Cryptographic encryption/decryption keys are used in this communication to make the communication with the financial institution a secure communication. In the presently described example, sensitive financial information is stored, at least temporarily, in fuel dispenser 1. This sensitive financial information includes user account numbers and user identity verification information. In the present example, fuel dispenser 1 also stores encryption/decryption keys for communication with the financial institution. Fuel dispenser 1 receives AC input power via an AC input conductor or conductors 6. Energy from these AC input power conductors 6 powers secure module 2 as well as other parts of fuel dispenser 1.

Figure 2:
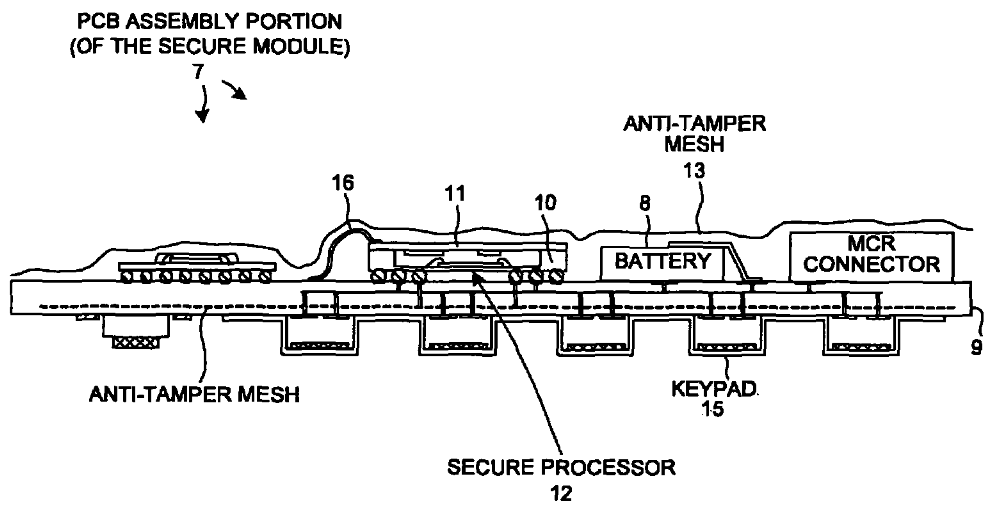
FIG. 2 is a simplified cross-sectional diagram of a part of a secure module of the fuel dispenser of FIG. 1.

FIG. 2 is a simplified cross-sectional diagram of a printed circuit board (PCB) assembly portion 7 of secure module 2. The enclosure of secure module 2 is not illustrated in FIG. 2 so that the circuitry within the enclosure will not be obscured. PCB assembly portion 7 includes a PCB 9. Various electronic components, including a battery 8, a packaged secure processor integrated circuit 10 and a novel heater circuit 11 are mounted to one side of PCB 9. Reference numeral 12 identifies the secure processor integrated circuit within its Ball Grid Array (BGA) package. An anti-tamper security mesh 13 covers the components 8, 10 and 11 as illustrated. Anti-tamper security mesh 13 is controlled by and monitored by a tamper detect circuit 14 (see FIG. 4) of secure processor 12. A keypad 15 is disposed on the opposite side of PCB 9. When a user presses a key on keypad 15, key scanning circuitry of secure processor 12 detects the key press.

Figure 3:
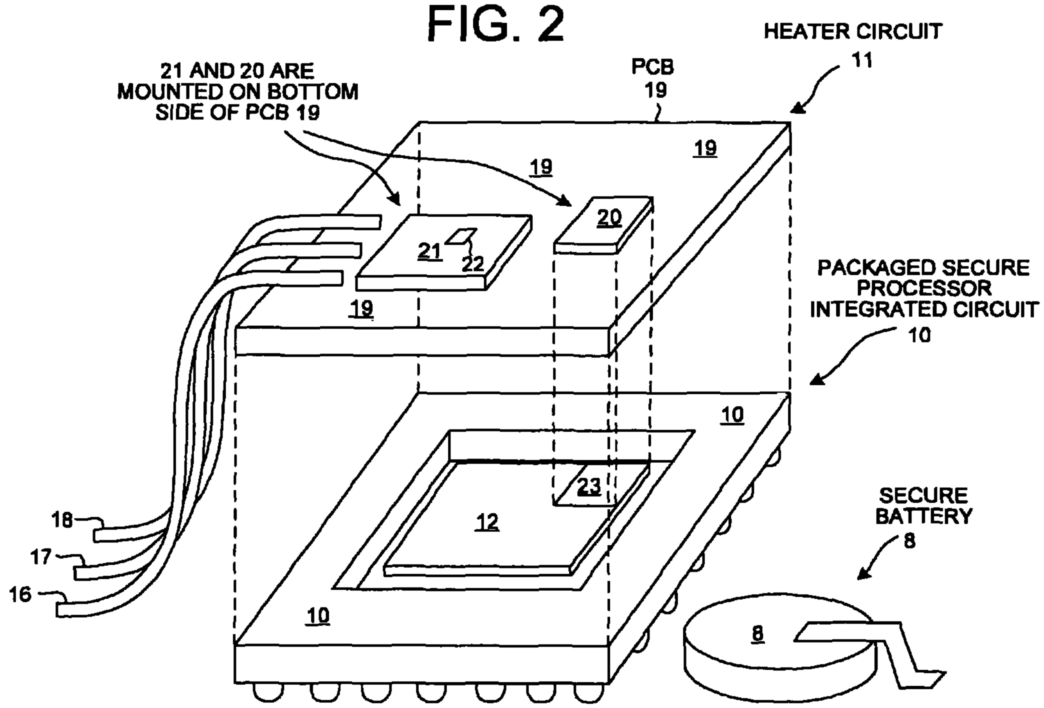
FIG. 3 is a simplified exploded perspective view of the heater circuit and packaged secure processor integrated circuit of FIG. 2.

FIG. 3 is a simplified exploded perspective view of packaged integrated circuit 10, secure processor integrated circuit 12, heater circuit 11, and battery 8 of FIG. 2. Three insulated wires (an external power wire 16, a battery power wire 17, and a ground wire 18) extend from PCB 9 to a PCB 19 of heater circuit 11. Heater circuit 11 includes a PTC (positive temperature coefficient) resistor 20 as well as a microcontroller 21. Microcontroller 21 has an on-board temperature sensor 22. PTC resistor 20 functions as a heater element. Resistor 20 is disposed with respect to secure processor integrated circuit 12 such that the resistor 20 is disposed directly above a security portion 23 of integrated circuit 12. Both microcontroller 21 and resistor 20 are disposed on the bottom side of PCB 19, within the cavity formed by PCB 19 and package 10. Security portion 23 includes, among other parts, tamper detect circuit 14, a secure memory controller 24 and a secure memory 25.

Figure 4:
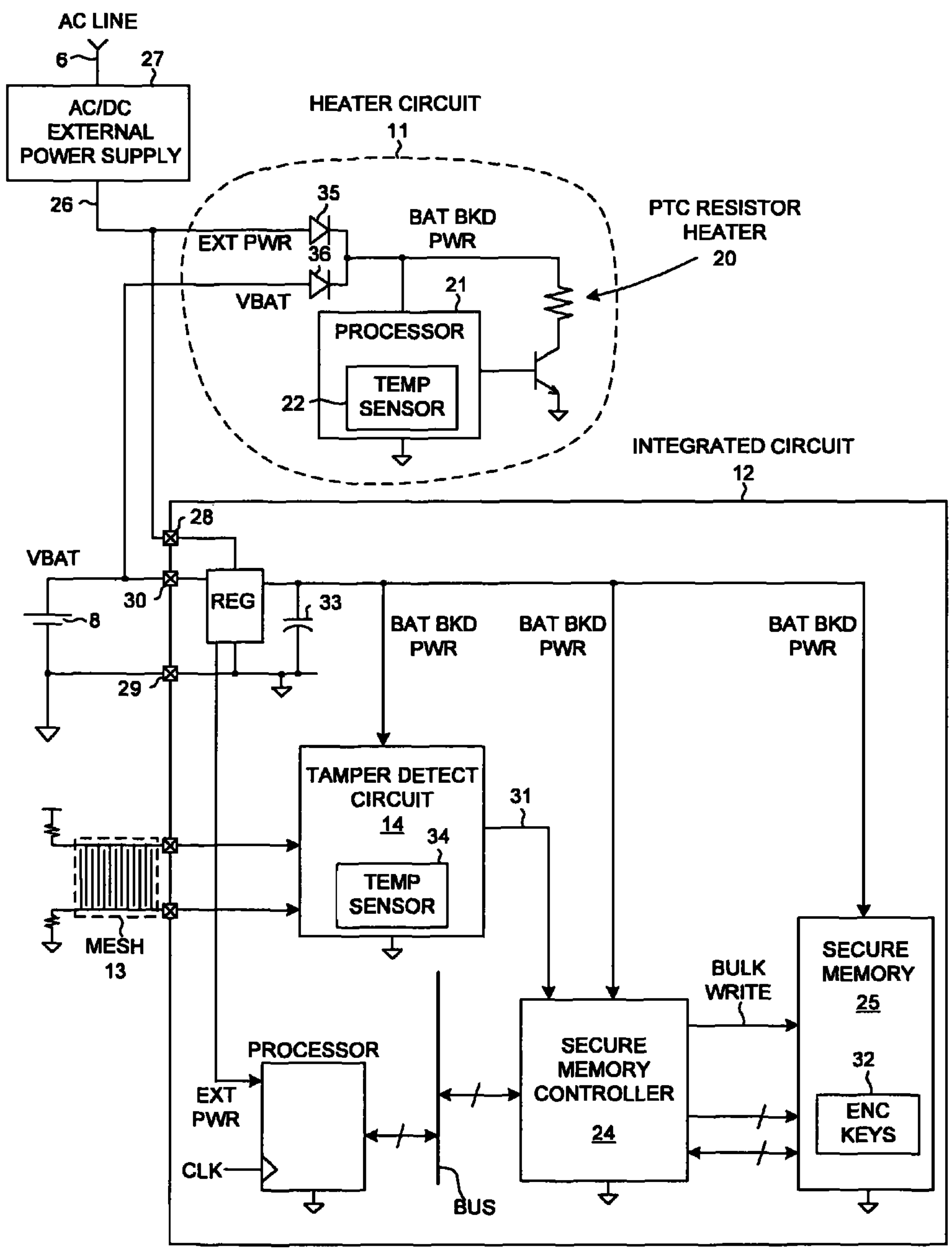
FIG. 4 is a simplified circuit diagram of the heater circuit 11 and secure processor integrated circuit 12 of FIG. 3.

FIG. 4 is a simplified block diagram of the circuitry of secure processor integrated circuit 12 and heater circuit 11 of FIG. 3. Integrated circuit 12 and heater circuit 11 are ordinarily powered by electrical energy received via power supply conductor 26. AC power is received into fuel dispenser 1 via AC conductors 6, and is converted into DC power by an external power supply 27. The resulting DC supply voltage is supplied via power conductor 26 to integrated circuit 12 and heater circuit 11.

If power is not available through power conductor 26, then battery 8 powers the heater circuit 11 and parts of integrated circuit 12. The parts of integrated circuit 12 include the tamper detect circuit 14, a secure memory controller 24, and secure memory 25. Therefore, if AC external power is lost such as due to a power outage due to a storm or downed power lines, then energy will not be received via power conductor 26 but rather battery 8 will power heater circuit 11, tamper detect circuit 14, secure memory controller 24 and secure memory 25. Tamper detect circuit 14 will continue to power anti-tamper mesh 13 thereby providing anti-tamper security to the circuitry disposed underneath mesh 13. When AC external power is restored, then energy is again received via power conductor 26 and terminal 28 and battery 8 no longer powers the circuitry. Battery 8 in this example is a lithium battery that, when in a fully charged state, has a one-ampere-hour storage capacity.

Tamper detect circuit 14 monitors the voltage across terminals 29 and 30, and therefore monitors the voltage of battery 8. If tamper detect circuit 14 determines that the battery voltage has dropped below a predetermined value, then a tamper condition is detected and tamper detect circuit 14 sends a tamper signal via conductor 31 to secure memory controller 24. Secure memory controller 24 in turn causes a bulk erase of secure memory 25. Sensitive financial information, such as user account information, identity verification information, and encryption/decryption keys 32 stored in secure memory 25 are erased. If adequate energy for this erasure cannot be received either via power conductor 26 or from battery 8, adequate energy will nevertheless be stored in an on-chip capacitor 33. The energy stored in on-chip capacitor 33 is then used to perform the security erasure. For additional background information and detail on operation of a secure processor integrated circuit such as secure processor integrated circuit 12, see U.S. Pat. No. 7,343,496, by Peter Hsiang et al., entitled “Secure Transaction Microcontroller With Secure Boot Loader”, (the subject matter of which is incorporated herein by reference).

Tamper detect circuit 14 includes a temperature sensor 34. If tamper detect circuit 14 determines, by monitoring temperature sensor 34, that the sensed temperature has dropped below a predetermined second temperature, then a tamper condition is detected. As explained above, tamper detect circuit 14 sends a tamper signal via conductor 31 to secure memory controller 24. Secure memory controller 24 in turn causes a bulk erase of secure memory 25. Sensitive financial information, such as user account information, identity verification information, and encryption/decryption keys 32 stored in secure memory 25 are erased. This second temperature may, for example, be set to be negative thirty degrees Celsius. The accuracy of the temperature, measurement may, however, only be accurate to within plus or minus ten degrees Celsius. Tamper detect circuit 14 may therefore detect a low temperature tamper condition at as high of a temperature as negative twenty degrees Celsius. If the tamper detect circuit 14 causes secure memory 25 to be, erased, then the secure module 2 can no longer be used by the filling station operator. Keys 32 are highly sensitive information. Generally, neither the manufacturer of integrated circuit 12 nor the manufacturer of the fuel dispenser 1 is made aware of the values of keys 32. Rather, a secure module is shipped to a third party key injection facility. The third party key injection facility loads keys 32 into secure memory of the secure module. The secure memory of the secure module is powered by battery 8 so the keys, once inserted, remain stored in the secure module. The secure module is then shipped to the fuel dispenser manufacturer, who in turn places the secure module into a fuel dispenser. The fuel dispenser is then shipped to the filling station and is installed for operation. Throughout this time, keys 32 are maintained in secure memory 25 and secure memory 25 is powered by battery 8.

If tamper detect circuit 14 were to detect a low temperature tamper condition (the sensed temperature is determined to be less than the second temperature) when the fuel dispenser 1 is operating in the field, then the keys 32 would be erased from secure memory 25. The result would be expensive for the filling station operator. The secure module 2 and its fuel dispenser 1 would be inoperable. The secure module 2 would then typically be shipped back to the key injection facility to have keys 32 reloaded into secure memory 25. The down time of the fuel dispenser and/or the secure module, and the associated cost of shipping the secure module to and back from the key injection facility, amounts to an undesirable cost to the filling station operator.

In on application, the novel fuel dispenser 1 of FIG. 1 operates in a very harsh low temperature condition such as exists in Canada and Alaska in the winter. The sensed temperature within a fuel dispenser that is not being tampered should not drop below the second temperature or the keys 32 will be erased as explained above. Accordingly, conventionally fuel dispensers of this type are designed such that there is enough heat dissipation within the fuel dispenser from other parts of the fuel dispenser that the inside of the fuel dispenser is somewhat self-heated. Due to this heating, the sensed temperature does not drop below the second temperature even on the coldest days in Canada and Alaska.

In accordance with one novel aspect, it is recognized that the existing solution to extremely cold outside air temperatures can be improved. If there is a power outage during such extreme low temperature conditions, then no electrical power will be flowing to the fuel dispenser. The conventional self-heating within fuel dispenser 1 due to dissipation of some of this electrical power within the fuel dispenser will not be occurring. During the power outage, the self-heating will not occur, and the sensed temperature will follow the actual outside air temperature down resulting in a false tamper detection condition and an undesirable erasing of the secure memory.

In accordance with one novel aspect, fuel dispenser 1 includes novel heating circuit 11 that in turn has a temperature sensor 22. If the sensed temperature drops below a first temperature (for example, negative twenty degrees Celsius) as sensed by temperature sensor 22, then microcontroller 21 causes current to flow through resistor 20. As explained above, resistor 20 functions as a heating element. Due to power multiplexing circuitry including diodes 35 and 36, if external power from power conductor 26 is not available, then heater circuit 11 is powered by energy received through diode 36 from battery 8. Therefore, even if fuel dispenser is not receiving AC power via AC power conductors 6 due to a power outage, heater circuit 11 nonetheless provides heating to the security portion of secure processor 12 using energy from battery 8.

Figure 5:
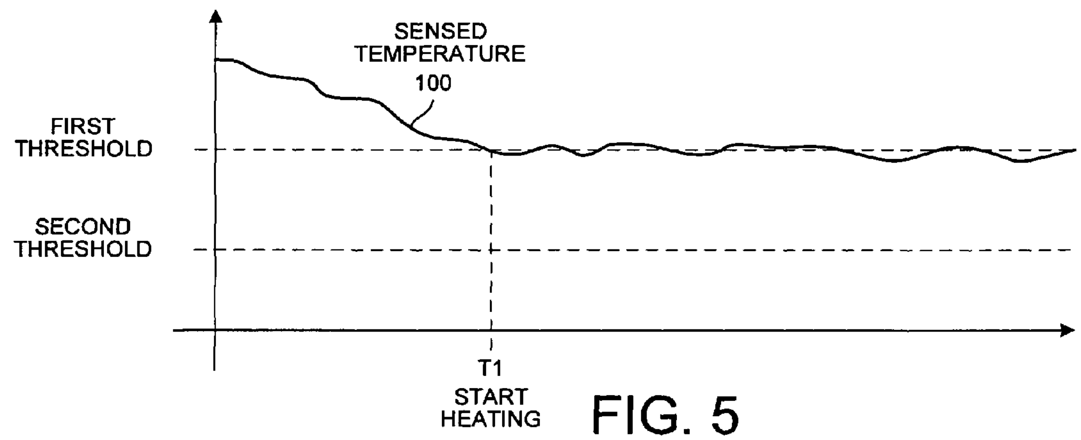
FIG. 5 is a waveform diagram that illustrates how the heater circuit maintains the temperature of the secure processor from falling below a first temperature (for example, negative twenty degrees Celsius) in one exemplary operational example.

FIG. 5 is a simplified diagram that illustrates an operation of the novel circuit of FIG. 4 during a natural cooling of fuel dispenser 1 due to cold outdoor environmental conditions in which fuel dispenser 1 is operating. Line 100 represents the sensed temperature as sensed by temperature sensor 34 and temperature sensor 22. As the sensed temperature decreases it crosses and drops below the first temperature (for example, negative twenty degrees Celsius) at time T1. Heater circuit 11 detects this condition and increases the amount of localized heating of the security portion of integrated circuit 12. In the example of FIG. 4, heater circuit 11 does this by conducting current through resistor 20. In the example illustrated in FIG. 5, secure module 2 is not submerged in liquid nitrogen and the small amount of increased localized heating provided by resistor 20 is enough to sustain the temperature of integrated circuit 12 at negative twenty degrees Celsius. If there is no power outage, then energy for this increased localized heating is received via power conductor 26. If adequate power cannot be received via power conductor 26 (for example, due to a power outage), then energy for the increased localized heating is received from battery 8 through diode 36. In one example, when fuel dispenser 1 is subjected to negative forty degrees Celsius outside air temperature conditions and no power is received via power conductor 26, heater circuitry 11 consumes an average current of 7.5 milliamperes and at this level of average power consumption is enough to maintain the temperature within fuel dispenser 1 at integrated circuit 12 at negative twenty degrees Celsius. Maximum current consumption of the heater element is 0.3 amperes. Assuming a fresh one ampere-hour battery 8, the battery 8 can power heater circuit 11 for approximately six consecutive days of non-stop negative forty degree Celsius weather.

Figure 6:
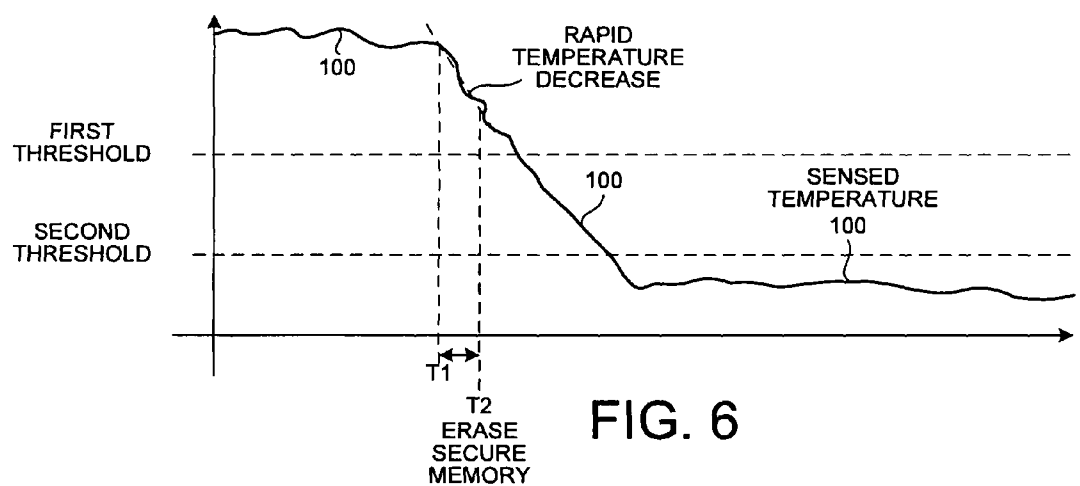
FIG. 6 is a waveform diagram that illustrates a situation of rapid temperature decrease that the tamper detect, circuit of FIG. 4 detects as a tamper condition.

FIG. 6 is a simplified diagram that illustrates a tamper condition. Tamper detect circuit 14 monitors the rate of change of temperature, and if the rate of change of temperature decrease exceeds a predetermined rate for a predetermined amount of time, then a tamper condition is detected, and secure memory 25 is erased. In the example illustrated in FIG. 6, the predetermined amount of time is from time T1 to time T2, and at time T2 the tamper condition is detected. A condition such as this would occur if secure module 2 were immersed in liquid nitrogen in a security attack.

Figure 7:
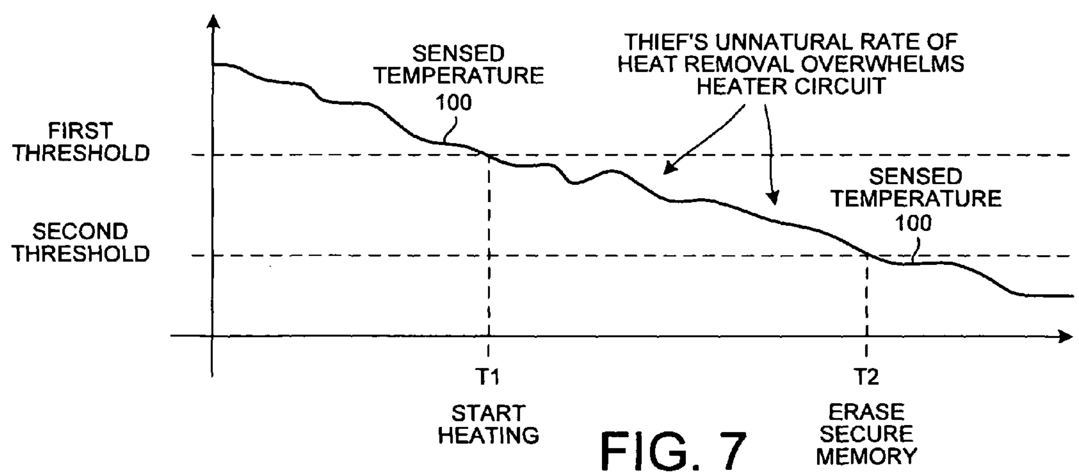
FIG. 7 is a waveform diagram of a more sophisticated security attack in which the temperature of the secure processor is slowly decreased below the first temperature. When the temperature of the secure processor falls below the second temperature, however, the tamper detect circuit detects a tamper condition and erases the secure memory.

FIG. 7 is a simplified diagram that illustrates a more sophisticated security attack in which the temperature of secure module 2 is decreased in a slow, more controlled manner, in an attempt to foil the anti-tamper circuit 14. A thief recognizes that a rapid drop in temperature is detected as a tamper condition, so the thief slowly drops the temperature of the secure module. The amount of heat extracted from integrated circuit 10 by the thief's actions is, however, more than heater circuit 11 can supply to integrated circuit 10. Accordingly, the temperature of integrated circuit 10 continues to drop below the first temperature (−20 degrees C.) despite heater circuit 11 being turned on at time T1. When the sensed temperature as sensed by tamper detect circuit 14 reaches the second temperature at time T2, however, tamper detect circuit 14 senses a tamper condition and causes secure memory 25 to be erased.

Although certain specific embodiments are described above for instructional purposes, the teachings of this patent document have general applicability and are not limited to the specific embodiments described above. The functionality of heater circuit 11 may be integrated onto integrated circuit 12 along with the other parts of integrated circuit 12. The disclosed heater circuit and associated novel methods see utility in devices other than in fuel dispensers. The heater circuit and associated methods see use in other types of security devices, such as ATM machines, that operate outdoors in extremely cold environments. Although a dedicated resistor is provided as a heater element in the embodiment of FIGS. 1-4 described above, other ways of increasing localized heating can be employed. For example, once the first temperature threshold is crossed, a part of the secure processor can be enabled and clocked thereby increasing power consumption and generating more heat. The clock rate of a part of the secure processor can be increased, or the processor of the secure processor can be made to switch more rapidly, thereby increasing power consumption and generating more heat. A heating element may be disposed inside a cavity containing the secure memory, or the heating element may be disposed outside the cavity. More than two temperature thresholds can be employed, and hysteresis can be employed around each threshold. Although a secure battery is disclosed, the battery may be disposed outside the anti-tamper security mesh in some embodiments. Cryptographic keys need not be stored in the fuel dispenser. Rather, in one embodiment the cryptographic keys are stored in a central controller that is located outside in the harsh environmental conditions along with the fuel dispensers. Alternatively, cryptographic keys may be stored in both the individual fuel dispensers as well as the central controller. The novel low temperature anti-tamper methods and circuits described above are usable to protect sensitive information in both the central controller as well as in the fuel dispensers. Accordingly, various modifications, adaptations, and combinations of various features of the described embodiments can be practiced without departing from the scope of the invention as set forth in the claims.

What is claimed is:

1. A method used by a secure device to protect sensitive information, comprising the steps of:

(a) determining whether a sensed temperature of the secure device is below a first temperature;

(b) if the sensed temperature is determined in (a) to be below the first temperature then increasing an amount of localized heating of a secure memory, wherein the secure memory can be powered by an external power supply or by a battery, wherein energy from the battery is used to increase the amount of localized heating if energy for the localized heating cannot be received from the external power supply;

(c) determining whether the sensed temperature of the secure device has dropped below a second temperature; and (d) if the sensed temperature is determined in (c) to have dropped below the second temperature then erasing the secure memory.

2. The method of claim 1, wherein the sensed temperature in (a) is sensed by a first temperature sensor, and wherein the sensed temperature in (c) is a temperature that is sensed by a second temperature sensor.

3. The method of claim 1, wherein the secure memory stores encryption keys, and wherein the encryption keys are erased in step (d) if the sensed temperature is determined in (c) to have dropped below the second temperature.

4. The method of claim 3, further comprising:

(e) powering an anti-tamper circuit using energy received from the battery if energy for the localized heating cannot be received in (b) from the external power supply.

5. The method of claim 1, wherein (a) through (d) are performed by circuitry of a secure module of a fuel dispenser, and wherein the battery is disposed in the secure module.

6. The method of claim 1, wherein an anti-tamper mesh covers the secure memory, and wherein the battery is disposed underneath the anti-tamper mesh along with the secure memory.

7. The method of claim 1, wherein the secure memory is a part of a packaged integrated circuit, and wherein the increased localized heating of (b) is due to current flow through a circuit, and wherein the circuit is disposed within a centimeter of the packaged integrated circuit.

8. The method of claim 1, wherein the secure memory is a part of a packaged integrated circuit, and wherein the increased localized heating of (b) is due to current flow through a circuit, and wherein the circuit is disposed within a package of the packaged integrated circuit.

9. The method of claim 1, further comprising:

(e) if a voltage of the battery drops below a predetermined voltage then erasing the secure memory.

10. The method of claim 1, wherein (c) and (d) are performed by a secure processor, and wherein (a) and (b) are performed by a heating circuit that is different from, but is attached to, the secure processor.

11. The method of claim 1, wherein (a) through (d) are performed by a secure module, and wherein the external power supply receives AC line power and outputs a DC supply voltage to the secure module.

12. An apparatus comprising:

a power conductor;

a battery;

a secure memory; and heater circuitry, wherein if the heater circuitry can draw energy via the power conductor and if the heater circuitry determines that a sensed temperature of the apparatus is below a first temperature then the heater circuitry uses energy received via the power conductor to increase localized heating the secure memory, otherwise if the heater circuitry cannot draw energy via the power conductor and if the heater circuitry determines that the sensed temperature of the apparatus is below the first temperature then the heater circuitry uses energy received from the battery to increase localized heating the secure memory.

13. The apparatus of claim 12, wherein the increased localized heating is due to current flow through a resistor of the heater circuitry, and wherein there is substantially no current flow through the resistor if the sensed temperature is above the first temperature.

14. The apparatus of claim 12, wherein if the sensed temperature drops below a second temperature then the secure memory is erased.

15. The apparatus of claim 14, wherein the apparatus is a secure module, wherein the power conductor is used to receive energy into the secure module from an external source.

16. The apparatus of claim 15, further comprising:

an anti-tamper mesh that consumes energy received from the battery if the apparatus cannot receive energy via power conductor.

17. The apparatus of claim 14, wherein the apparatus is a part of a fuel dispenser.

18. A fuel dispenser adapted to receive electrical energy from an external source, the fuel dispenser comprising:

a secure memory that is automatically erased if a sensed temperature of the fuel dispenser drops below a second temperature;

a battery; and a heater circuit that heats the secure memory if the sensed temperature is below a first temperature, wherein the heater circuit uses energy drawn from the battery to heat the secure memory if the fuel dispenser is not receiving the electrical energy from the external source.

19. An apparatus comprising:

a power conductor; and means, coupled to the power conductor, for increasing localized heating of a secure memory using energy drawn from a battery if a sensed temperature of the apparatus is below a first temperature and if the means is not able to receive energy via the power conductor, whereas if the sensed temperature is below a first temperature and if the means is able to receive energy via the power conductor then the means increases localized heating of the secure memory using energy received via the power conductor, and wherein the means is also for erasing information stored in the secure memory if the sensed temperature of the apparatus drops below a second temperature.

20. The apparatus of claim 19, wherein the means includes a resistor, and wherein the means causes said localized heating by causing a current to flow through the resistor, wherein substantially no current flows through the resistor when the sensed temperature is above the first temperature.

21. The apparatus of claim 19, wherein a part of the means consumes a current when the sensed temperature is above the first temperature, and wherein the means increases localized heating of the secure memory by increasing current consumption of the part of the means.

22. The apparatus of claim 19, wherein the apparatus is part of a fuel dispenser, and wherein the information includes cryptographic keys.

* * * * *